UNITED STATES PATENT OFFICE.

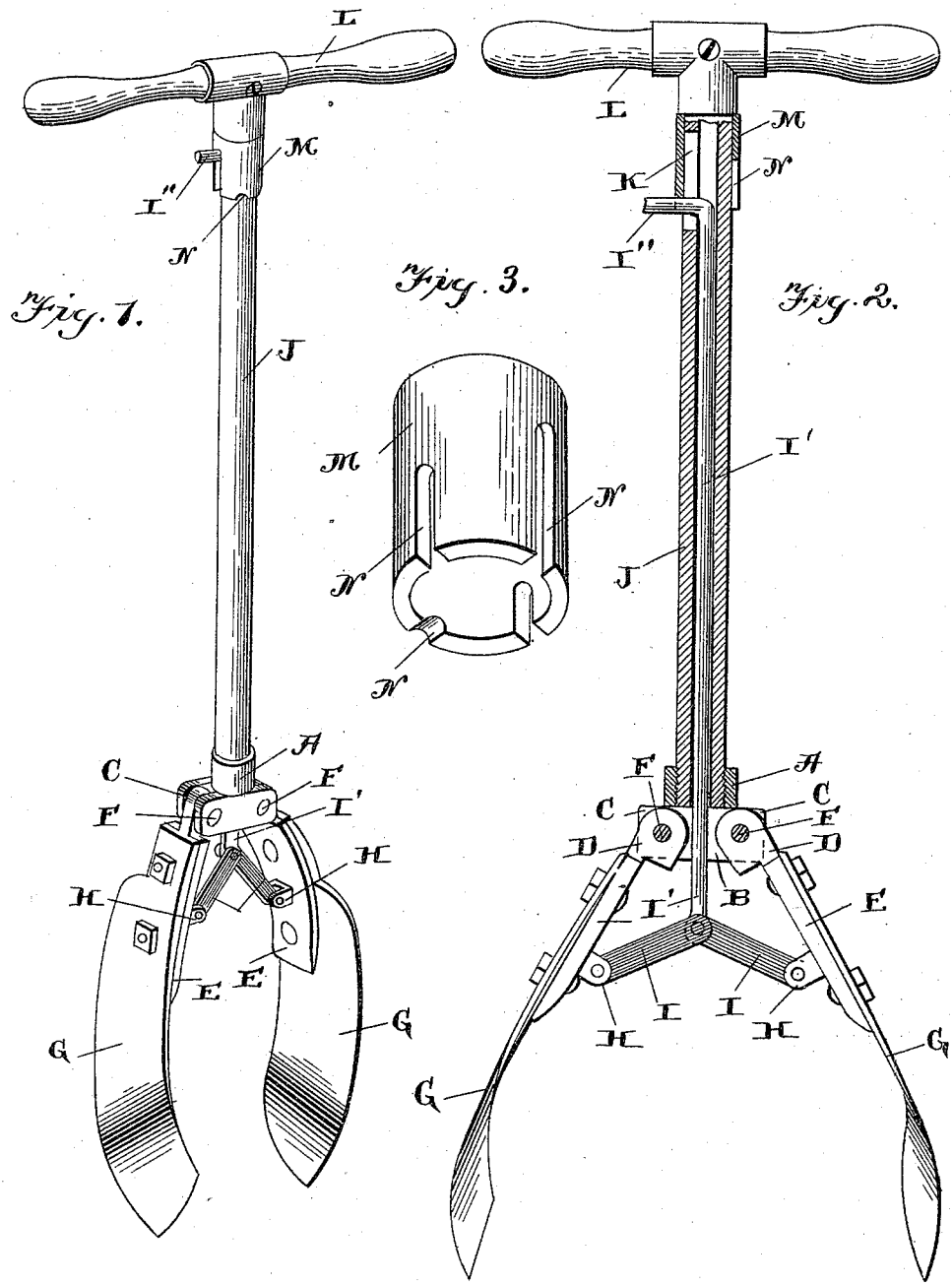

WISTON ALLIN SMITH, OF REAGAN, TEXAS, ASSIGNOR OF ONE-HALF TO
J. B. COTTEN, OF SAME PLACE.

EARTH-AUGER.

SPECIFICATION forming part of Letters Patent No. 537,729, dated April 16, 1895.

Application filed October 3, 1894. Serial No. 524,812. (No model.)

*To all whom it may concern:*

Be it known that I, WISTON ALLIN SMITH, of Reagan, in the county of Falls and State of Texas, have invented certain new and useful Improvements in Earth-Augers; and I do hereby declare the following to be a full, clear, and exact description of the invention, such as will enable others skilled in the art to which it pertains to make and use it, reference being had to the accompanying drawings, which form part of this specification.

My invention relates to an improved earth auger; and the object of the same is to provide a tool which will be most effectual in forming openings in the earth; and a further object is to so construct the same as to make it available for forming openings of various sizes.

The invention consists in the novel features of construction hereinafter fully described and claimed, and illustrated in the accompanying drawings, in which—

Figure 1 is a perspective view of the tool. Fig. 2 is a vertical sectional view of the same. Fig. 3 is a detail view of the sleeve for holding the auger adjusted for the size of opening desired.

A designates an interiorly screw threaded head enlarged at its lower end as shown at B, and this enlargement is cut inward upon opposite sides at C for the purpose of accommodating projections D of the wings E, the said projections being secured in the cuts by pivots F.

Secured to the wings E are blades G each having a sharpened edge and said edges extended in opposite directions. The lower ends of these blades are turned inward and slightly curved or twisted as shown for the purpose of effectually cutting out the opening as well as retaining between them the earth to be removed.

Upon the inner side of wings E are the double bearing studs H between which the lower ends of links I are pivotally secured. The upper ends of these links are in like manner secured to the lower end of rod I'. Said rod extends vertically through the hollow stem J which latter at its lower end is removably secured in the screw threaded head A as shown. The upper end of stem J is slotted longitudinally as shown at K and through this slot is projected the upper outwardly bent end of rod I' to form a handle I''. At the upper end of the stem is the T-shaped tool handle L.

In operation the tool is thrust into the ground with the blades separated the desired distance to make an opening of the required diameter and the tool is revolved in order to cut the opening. The earth may readily be removed by drawing upward on the handle I'' which serves to throw together the blades as will be readily understood thus clamping the earth therebetween.

For the purpose of holding the blades separated to the desired distance I provide at the upper end of the stem a sleeve M which is formed with a plurality of upwardly extending slots N which are of different lengths and the said sleeve is adapted to fit between handle I'' and the tool handle as is shown, the rod handle I'' extending outward through one of the slots of the sleeve. The said slots being of different lengths it will be seen that the handle I'' may be held in a well raised position thus holding the blades close together for the purpose of forming small openings or the said handle may be held depressed a considerable distance by arranging thereover one of the shorter slots of said sleeve, thus tending to hold normally apart the blades for making a larger opening.

Having thus fully described my invention, what I claim, and desire to secure by Letters Patent, is—

An earth auger comprising the stem, the separable blades at the lower end thereof, rod I and connections for opening and closing said blades by moving the rod vertically, lateral extension I'' on the rod projected through the hollow stem in which said rod is located, and the collar *m* loose on the stem and formed with vertical slots N for engaging the collar with extension I'' and thus limiting movement of the rod I for the purpose substantially as shown and described.

In testimony whereof I affix my signature in presence of two witnesses.

WISTON ALLIN SMITH.

Witnesses:
W. B. HAGENS,
A. M. DAVIS.